(12) United States Patent
Sumida et al.

(10) Patent No.: US 6,334,433 B1
(45) Date of Patent: Jan. 1, 2002

(54) CYLINDER INJECTING FUEL INJECTION VALVE

(75) Inventors: Mamoru Sumida; Norihisa Fukutomi, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/704,679

(22) Filed: Nov. 3, 2000

(30) Foreign Application Priority Data

Nov. 10, 1999 (JP) .................................................. 11-319386

(51) Int. Cl.[7] .................................................... F02M 37/04
(52) U.S. Cl. ............................ 123/470; 123/509; 277/593
(58) Field of Search .................................... 123/470, 509, 123/41.31, 469, 468, 456, 541; 277/593, 592

(56) References Cited

U.S. PATENT DOCUMENTS

| | | | | | |
|---|---|---|---|---|---|
| 4,776,602 A | * | 10/1988 | Gallo | ............................ | 277/233 |
| 5,257,594 A | * | 11/1993 | Methven | ........................ | 114/354 |
| 5,487,368 A | * | 1/1996 | Bruning | ......................... | 123/470 |
| 5,630,400 A | * | 5/1997 | Sumida et al. | ................ | 123/470 |
| 5,706,787 A | * | 1/1998 | Fujikawa | ........................ | 123/470 |
| 5,752,487 A | * | 5/1998 | Harrell et al. | ................. | 123/470 |
| 5,785,024 A | * | 7/1998 | Takei et al. | .................... | 123/470 |
| 5,893,566 A | * | 4/1999 | Miyaoh et al. | ................ | 277/592 |
| 5,951,021 A | * | 9/1999 | Ueta | .............................. | 277/593 |
| 5,954,343 A | | 9/1999 | Sumida etal. | | |
| 6,196,195 B1 | * | 3/2001 | Trutschel et al. | ............. | 123/470 |

FOREIGN PATENT DOCUMENTS

| | | |
|---|---|---|
| JP | 9-126089 | 5/1997 |
| JP | 10-89192 | 4/1998 |
| WO | WO90/04716 | 5/1990 |

* cited by examiner

Primary Examiner—Carl S. Miller
(74) Attorney, Agent, or Firm—Sughrue Mion, PLLC

(57) ABSTRACT

A cylinder injecting fuel injection valve including a seal gasket sealing at least first two of three regions defined between the shoulder portion of the fuel injection valve main body, the shoulder portion of the cylinder head and an outer circumferential portion of the fuel injection valve main body. The gasket comprises an annular metallic elastic member and an annular support member elastically supporting the metallic elastic member. The gasket abuts at an abutting surface against the shoulder portion of the cylinder head at an axial position closer to the combustion chamber of the internal combustion engine than an upstream side end surface of the swirler member. The metallic elastic member of the gasket having a contacting surface contacting with an outer circumferential portion of the fuel injection valve main body, the end portion of the contacting surface of the metallic member being positioned at an axial position closer to the combustion chamber of the internal combustion engine than an upstream side end surface of the swirler member. The gasket having an inner circumferential surface opposing to an outer circumferential surface of at least the swirler body of the swirler body and the valve seat heated by the combustion chamber.

15 Claims, 2 Drawing Sheets

CYLINDER INJECTING FUEL INJECTION VALVE

BACKGROUND OF THE INVENTION

This invention relates to a cylinder injecting fuel injection valve and, particularly, to a cylinder injecting fuel injection valve provided with a hermetic seal.

Examples of conventional cylinder injecting fuel injection valve are found in Japanese Patent Laid-Open No. 9-126089, Japanese Patent Publication No. 2768522 and Japanese Patent Laid-Open No. 10-89192. In the cylinder injecting fuel injection valves disclosed in these patent documents, high-pressure seals are required for maintaining hermetic seals between the cylinder and the fuel injection valve.

However, the above-described high pressure seals for realizing the seal of the combustion gas aims only at the sealing function, so that the blocking of 47, the heat from the combustion gas is not satisfactory because the heat insulation was not positively provided but was only resulted from the gas sealing. On the other hand, components designed for heat insulation or heat dissipation from the injection valve to the cylinder head pauses problems in easy assembly, sprayed fuel and costs.

In the example disclosed in Japanese Patent Laid-Open No. 9-126089, the main object is to dissipate the heat of the injection valve tip from the combustion gas is relieved through the metallic ring into the cylinder head, so that, as long as the ring has a notch, it has been difficult to obtain a combustion gas seal although the ingress of flames into the clearance may be prevented. Even when two rings are used together in a juxtaposed relationship, a high-pressure combustion gas as high as 7 to 8 MPa has not been satisfactorily sealed.

The example disclosed in Japanese Patent Publication No. 2768522 is a fuel injection valve for a Diesel engine in which a massive tightening torque is needed to tighten the tightening nut between the injection valve and the cylinder head. While the seal for the combustion gas between the cylinder head and the tightening nut is provided by a ring packing in this case, the seal for the combustion gas between the injection valve and the tightening nut in the case of Diesel fuel injection valve is known to be achieved by a ring-shaped packing at the upstream of the heat insulating plate. Such heat insulating plate becomes supported only when the fuel injection valve and the tightening nut are combined together and it is not engaged with the injection valve by itself.

In the example disclosed in Japanese Patent Laid-Open No. 10-89192, while the discussion is made as to the sealing of the fuel injection valve against the combustion gas as well as the improvements in dissipation of the heat from the fuel injection valve heated by the combustion gas, the sealing of the combustion gas is achieved by the gasket 13.

Also, in the arrangements disclosed in Japanese Patent Laid-Open Nos. 9-126089 and 10-89192, it is necessary to eliminate the clearance defined between the fuel injection valve and the cylinder head, so that the fuel injection valve is difficult to be mounted or dismounted. Also, it is possible that a damage may be given to the inner surface of the cylinder head and the outer surface of the fuel injection valve by attaching the heat dissipating device thereto, so that they can not possibly serve as desired after the fuel injection valve is detached and attached for any reasons even when a fresh heat dissipation device is substituted.

Further, since there is no clearance in the radial direction, if the fuel injection valve and the cylinder head are assembled together with a poor alignment, the components around the nozzle of the fuel injection valve and the components in the vicinity of the electromagnetic drive unit of the injection valve are subjected to relative lateral loads, resulting in the possibility of changing the performance of the fuel injection valve itself.

According to Japanese Patent Laid-Open No. 9-112697 assigned to the same assignee of the present application, the inner diameter side of the seal ring is provided with engagement projections for engaging with the fuel injection valve to facilitate the assembly into the fuel injection valve. However, due to the axially asymmetrically provided projections in this seal ring, the stress distribution in the seal ring during the usage is not axial symmetry, leading to decrease in the durability. Also, the copper gasket 32 disclosed in Japanese Patent Laid-Open No. 9-112382 does not serve to seal the combustion gas but only serves to provide an intimate contact between the flange of the fuel injection valve and the cylinder head because this arrangement cannot provide a pressure load sufficiently large to press and seal the combustion gas.

If a complicated structure is used at the nozzle tip portion of the fuel injection valve as a counter measure for deposit on the fuel injection valve, the productivity and the cost are adversely affected.

According to Japanese Patent Laid-Open No. 10-252609, a copper gasket having a heat conductivity equal to or higher than the injector is disposed within the axial clearance between the injector and the cylinder head. This gasket is required not only to conduct the heat but also to seal the combustion gas. When the copper gasket is plastically deformed in order to seal the combustion gas, a significantly large pressure load must be applied to the copper gasket, which may cause the deformation of the precision-machined portion within the injector and the change in its performance. Also, another example disclosed in this same patent document is, similarly to that disclosed in Japanese Patent Laid-Open No. 10-89192, required to have no clearance between the fuel injection valve and the cylinder head, posing a problem of difficult attaching and detaching operation of the fuel injection valve.

Accordingly, the main object of the present invention is to provide a cylinder injecting fuel injection valve free from the above-discussed problems of the conventional cylinder injecting fuel injection valve.

Another object of the present invention is to provide a cylinder injecting fuel injection valve that is reliable, and that is excellent in heat insulation with a simple structure, being good in insulation of heat of the combustion gas or in heat dissipation from the fuel injection valve to the cylinder head on one hand, and that is satisfactory in sealing function, realizing the improvements in the insulation of the fuel injection valve from the combustion gas and in the dissipation of the heat of the fuel injection valve heated by the combustion gas.

SUMMARY OF THE INVENTION

With the above objects in view, the present invention resides in a cylinder injecting fuel injection valve that can be inserted into a cylinder head of an internal combustion engine and supported by a shoulder portion of a fuel injection valve main body and a shoulder portion of the cylinder head. The fuel injection valve includes a valve seat facing to a combustion chamber when attached to the engine and a swirler member providing whirling movement to the injected fuel. The valve has a seal gasket sealing, when attached to the engine, at least first two of three regions defined between the shoulder portion of the fuel injection valve main body, the shoulder portion of the cylinder head and an outer circumferential portion of the fuel injection valve main body. The gasket comprises an annular metallic elastic member brought into contact with the shoulder portion of the fuel injection valve main body, the shoulder portion of the cylinder head and the outer circumferential portion of the fuel injection valve main body, and an annular support member elastically supporting the metallic elastic member and brought into elastic contact with the shoulder portion of the cylinder head and the shoulder portion of the fuel injection valve main body. The gasket abuts at an abutting surface against the shoulder portion of the cylinder head at an axial position closer to the combustion chamber of the internal combustion engine than an upstream side end surface of the swirler member.

The present invention also resides in the cylinder injecting fuel injection valve that can be inserted into a cylinder head of an internal combustion engine and supported by a shoulder portion of a fuel injection valve main body and a shoulder portion of the cylinder head. The fuel injection valve includes a valve seat facing with a combustion chamber when attached to the engine and a swirler member providing whirling movement to injected fuel. The valve has a seal gasket surrounding, when attached to the engine, the fuel injection valve main body and sealing at least first two of three regions defined between the shoulder portion of the fuel injection valve main body, the shoulder portion of the cylinder head and an outer circumferential portion of the fuel injection valve main body. The gasket comprises an annular metallic elastic member brought into contact with the shoulder portion of the fuel injection valve main body, the shoulder portion of the cylinder head and the outer circumferential portion of the fuel injection valve main body, and an annular support member elastically supporting the metallic elastic member and brought into elastic contact with the shoulder portion of the cylinder head and the shoulder portion of the fuel injection valve main body. The metallic elastic member of the gasket has a contacting surface contacting with an outer circumferential portion of the fuel injection valve main body, the end portion of the contacting surface of the metallic member being positioned at an axial position closer to the combustion chamber of the internal combustion engine than an upstream side end surface of the swirler member.

Also, the present invention resides in the cylinder injecting fuel injection valve that can be inserted into a cylinder head of an internal combustion engine and supported by a shoulder portion of a fuel injection valve main body and a shoulder portion of the cylinder head. The fuel injection valve includes a valve seat facing with a combustion chamber when attached to the engine and a swirler member providing whirling movement to injected fuel. The valve has a seal gasket surrounding, when attached to the engine, the fuel injection valve main body and sealing at least first two of three regions defined between the shoulder portion of the fuel injection valve main body, the shoulder portion of the cylinder head and an outer circumferential portion of the fuel injection valve main body. The gasket comprises an annular metallic elastic member brought into contact with the shoulder portion of the fuel injection valve main body, the shoulder portion of the cylinder head and the outer circumferential portion of the fuel injection valve main body, and an annular support member elastically supporting the metallic elastic member and brought into elastic contact with the shoulder portion of the cylinder head and the shoulder portion of the fuel injection valve main body. The gasket may have an inner circumferential surface opposing to an outer circumferential surface of at least the swirler body of the swirler body and the valve seat heated by the combustion chamber.

The metallic elastic member of the gasket may be made of a spring steel such as stainless steel and the support member may be made of compound material of non-asbestos material.

The metallic elastic member of the gasket may have a surface coating of a fluororesin or fluororubber.

The support member of the gasket may be an annular member and the metallic elastic member may be an annular member having a U-shaped cross-sectional configuration disposed on a surface of support member.

The gasket may comprise a plurality of gasket elements stacked in an axial direction.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
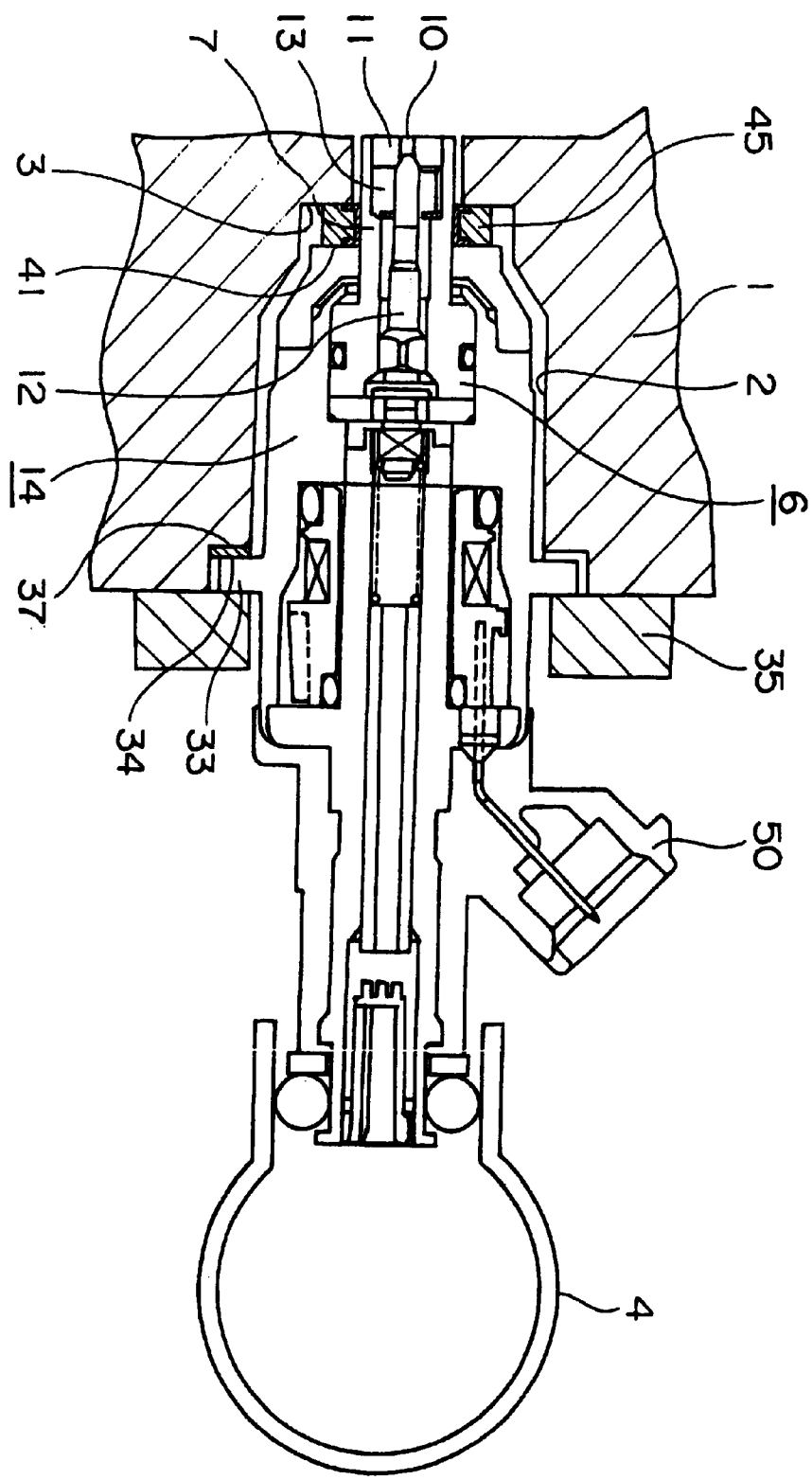
FIG. 1 is a sectional side view of a cylinder injecting fuel injection valve of the present invention.

FIG. 1 is a sectional view of a cylinder injecting fuel injection valve 50 of an embodiment of the present invention and showing the state in which it is inserted into a fuel injection valve insertion bore 2 formed in a cylinder head 1 of an internal combustion engine. In FIG. 1, the cylinder injecting fuel injection valve 50 is mounted with its tip inserted into the valve insertion bore 2 having a shoulder portion 3 of the cylinder head 1 and is provided at its rear end with a housing 14 to which a fuel supply pipe 4 is connected. The housing 14 is firmly held at its central portion by a holder member 35 for pressing a flange 33 to the cylinder head 14 and supports at its tip portion a valve device 6.

Figure 2:
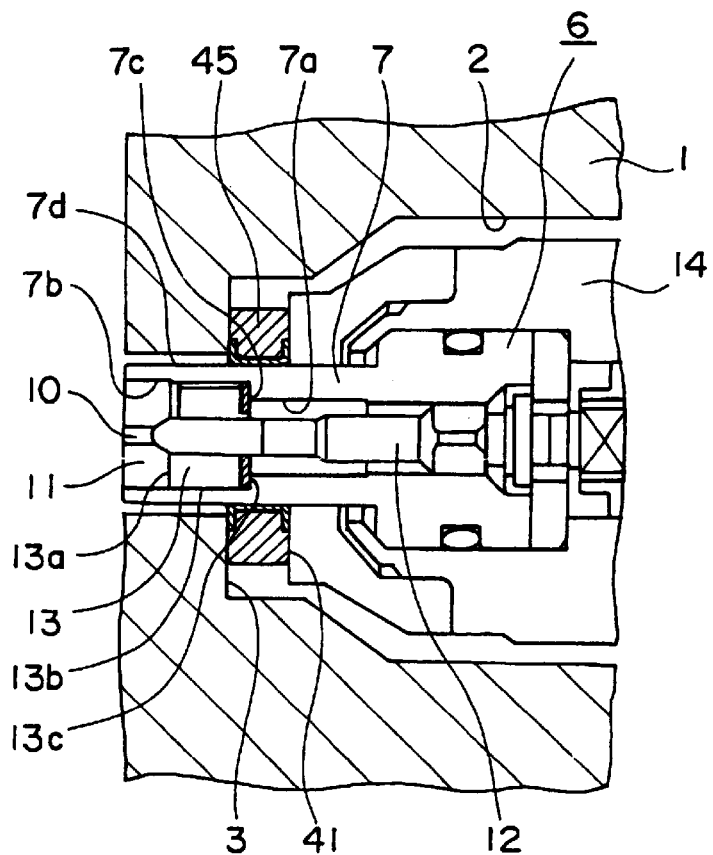
FIG. 2 is a sectional view showing how the gasket is fitted in a cylinder injecting fuel injection valve of the present invention.
Figure 3:
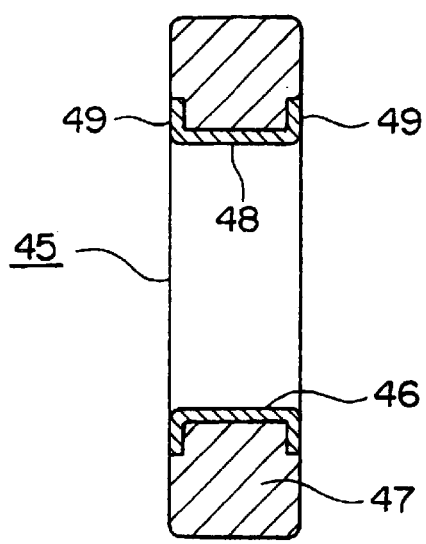
FIG. 3 is a sectional view of the gasket of the cylinder injecting fuel injection valve of the present invention.

As shown in detail in the fragmental enlarged sectional view of FIG. 2, the valve device 6 comprises a substantially tubular valve main body 7 projecting from the housing 14, a valve seat 11 disposed within the valve main body 7 to position facing toward the combustion chamber (the space at the left in FIG. 2) and having a fuel injection port 10, a needle valve 12 separating and contacting for opening and closing the fuel injection port 10 and a swirler member 13 for guiding the needle valve 12 in the axial direction and for giving a swirling motion to the fuel that is about to flow into the fuel injection port 10 formed in the valve seat 11 in the radially inward direction. Defined within the inner circumference of the tubular valve main body 7 are a small-diameter first inner circumference surface 7a for supporting the needle valve 12, a large-diameter second inner circumference 7b positioned closer to the tip portion than the first inner circumference surface 7a for accommodating and supporting the valve seat 11 and the swirler member 13, and a shoulder portion 7c defined between the first and the second inner circumference surfaces 7a and 7b.

The valve seat 11 is fitted within and secured to the inner circumference surface 7b of the tubular valve main body 7 and defines the tip of the valve device 6. The swirler member 13 intimately contacts at its first end surface 13a to the rear of the valve seat 11, at its outer circumference surface 13b to the inner circumferential surface 7b of the valve main body 7, and at its second end surface 13c to the shoulder portion 7c of the valve main body 7 and is firmly supported thereto.

Defined within the fuel injection valve insertion bore 2 of the cylinder head 1 are mounting surface 37 (see FIG. 1) for supporting a flange 33 at the central portion in the axial direction of the housing 14 through a gasket 34 and a seal surface 3 or a shoulder portion opposing with the gasket 45 interposed therebetween with a tip surface 41 of the housing 14. The gasket 45, when the valve is mounted to the engine, seals at least first two clearances out of three clearances defined between the seal surface 41 of the housing 14 which is the shoulder portion of the fuel injection valve 50, the shoulder portion 3 within the valve insertion bore 2 of the cylinder head 1 and the outer circumferential portion 7d of the valve main body 7 of the valve device 6.

The gasket 45 comprises an annular metallic elastic member 46 brought into contact with the shoulder portion 41 of the fuel injection valve main body 7, the shoulder portion 3 of the cylinder head 1 and the outer circumferential portion 7d of the fuel injection valve main body 7, and an annular support member 47 of a substantially rectangular cross-section, elastically supporting the metallic elastic member 46 and brought into elastic contact with the shoulder portion 3 of the cylinder head 1 and the shoulder portion 41 of the fuel injection valve main body 7. The metallic elastic member 46 comprises a hollow cylindrical portion 48 and flange portions 49 extending radially from the opposite ends of the hollow cylindrical portion 48. The metallic elastic member 46 is made of a spring steel of a stainless steel group and the support member 47 is made of compound material of non-asbestos material, and the metallic elastic member 46 has a surface coating of a fluororesin or fluororubber.

According to the present invention, the axial position of the shoulder portion 3 of the cylinder head 1 (i.e., the axial position of the axial end surface of the metallic elastic member 46 which is the abutting surface of the gasket 45 against the shoulder portion 3) is arranged to be axially spaced apart in the axial direction toward the combustion chamber of the internal combustion engine (i.e., toward the tip of the fuel injection valve 50) by a predetermined distance from the axial position of a second end surface 13c which is an upstream side end surface of the swirler member 13 (i.e., the axial position of the shoulder portion 7c of the fuel injection valve main body 7). In other words, the end portion of the contacting surface of the metallic elastic member 46 of the gasket 45 contacting with the outer circumference portion 7d of the fuel injection valve main body 7 is positioned at an axial position separated by the above predetermined distance toward the combustion chamber of the internal combustion engine from the upstream side end surface 13c of the swirler member 13 as viewed in the flow direction of the fuel.

With such the structure, the metallic elastic member 46 of the gasket 45 exhibits the sealing function due to the similar function as that of the so-called C-ring. Also, since the flange portions 49 are provided at the opposite ends of the hollow cylindrical portion 48, a large the abutting surface is ensured between the cylinder head 1 and the housing 14, thus providing a high sealing performance and, particularly on the side of the cylinder head 1, a sufficient seal can be established even with respect to cast cavities which may appear in the machined surface of the shoulder portion of the cylinder head 1.

Also, since the metallic elastic member 46 is reinforced by the support member 47, the pressure load needed for the gasket 45 can be adjusted by suitably combining the configurational design of the metallic elastic member 46 and the material and configurational design of the support member made mainly of a non-metallic material, so that the undesirable collapsing and plastic deformation of the C-shaped or U-shaped metallic elastic member 46 can be prevented.

Further, with the above structure, the gasket 45 is provided with an inner circumferential surface opposing in the radial direction at least to the outer circumferential surface 13b of the swirler member 13 out of the valve seat 11 and the swirler member 13 both heated by the heat in the combustion chamber. Therefore, the heat of the combustion chamber transmitted from the valve seat 11 to the swirler member 13 is transmitted to the metallic elastic member 46 from the outer circumferential surface 13b of the swirler member 13 through the thin portion of the valve main body 7 and through the inner circumferential surface of the metallic elastic member 46 of the gasket 45. This heat is partly transmitted to the cylinder head 1 through the flange portion 49 of the metallic elastic member 46 contacting with the cylinder head 1 and partly transmitted quickly to the housing 14 from the hollow cylindrical portion 48 through the other flange portion 49, so that the heat does not accumulate in the tip portion of the fuel injection valve.

Such the gasket 45 does not give undesirable effect on the easy assembly (mounting) of the gasket 45 into the fuel injection valve and the easy assembly (mounting) of the fuel injection valve to which the gasket 45 is mounted into the cylinder head 1, ensuring that the assembly and disassembly be carried out without any problem.

If desired, a plurality of same gaskets 45 as gasket elements may be stacked in the axial direction to obtain a gasket assembly, which may be inserted between the housing 14 and the shoulder portion 3 of the cylinder head 1. In this case, the end surfaces or the flange portions 49 of the metallic elastic members 46 are brought into intimate contact with each other, so that a heat conduction path similar to that described above can be provided. Also if desired, the thickness of the axial dimension of each gasket 45 that is to be stacked in the axial direction may be decreased so that the overall axial dimension of the gasket assembly including a plurality of gasket elements does not become too large.

As has been described, according to the present invention, the cylinder injecting fuel injection valve includes a valve seat facing to a combustion chamber when attached to the engine and a swirler member providing whirling movement to the injected fuel, the valve having a seal gasket sealing, when attached to the engine, at least first two of three regions defined between the shoulder portion of the fuel injection valve main body, the shoulder portion of the cylinder head and an outer circumferential portion of the fuel injection valve main body, the gasket comprising an annular metallic elastic member brought into contact with the shoulder portion of the fuel injection valve main body, the shoulder portion of the cylinder head and the outer circumferential portion of the fuel injection valve main body, and an annular support member elastically supporting the metallic elastic member and brought into elastic contact with the shoulder portion of the cylinder head and the shoulder portion of the fuel injection valve main body, the gasket abutting at an abutting surface against the shoulder portion of the cylinder head at an axial position closer to the combustion chamber of the internal combustion engine than an upstream side end surface of the swirler member. Therefore, a cylinder injecting fuel injection valve can be obtained that is reliable, and that is excellent in heat insulation with a simple structure, being good in insulation of heat of the combustion gas or in heat dissipation from the fuel injection valve to the cylinder head on one hand, and that is satisfactory in sealing function, realizing the improvements in the insulation of the fuel injection valve from the combustion gas and in the dissipation of the heat of the fuel injection valve heated by the combustion gas.

The metallic elastic member of the gasket has a contacting surface contacting with an outer circumferential portion of the fuel injection valve main body, and the end portion of the contacting surface of the metallic member is positioned at an axial position closer to the combustion chamber of the internal combustion engine than an upstream side end surface of the swirler member. Also, the gasket has an inner circumferential surface opposing to an outer circumferential surface of at least the swirler body of the swirler body and the valve seat heated by the combustion chamber. Therefore, the cylinder injecting fuel injection valve can be obtained that is reliable, and that is excellent in heat insulation with a simple structure, being good in insulation of heat of the combustion gas or in heat dissipation from the fuel injection valve to the cylinder head on one hand, and that is satisfactory in sealing function, realizing the improvements in the insulation of the fuel injection valve from the combustion gas and in the dissipation of the heat of the fuel injection valve heated by the combustion gas.

What is claimed is:

1. A cylinder injecting fuel injection valve inserted into a cylinder head of an internal combustion engine and supported by a shoulder portion of a fuel injection valve main body and a shoulder portion of the cylinder head;

said fuel injection valve including a valve seat facing with a combustion chamber when attached to the engine and a swirler member providing whirling movement to injected fuel;

said valve having a seal gasket sealing, when attached to the engine, at least first two of three regions defined between the shoulder portion of the fuel injection valve main body, the shoulder portion of said cylinder head and an outer circumferential portion of said fuel injection valve main body;

said gasket comprising;
     an annular metallic elastic member brought into contact with said shoulder portion of said fuel injection valve main body, said shoulder portion of said cylinder head and said outer circumferential portion of said fuel injection valve main body; and
     an annular support member elastically supporting said metallic elastic member and brought into elastic contact with said shoulder portion of said cylinder head and said shoulder portion of said fuel injection valve main body;
     said gasket abutting at an abutting surface against said shoulder portion of said cylinder head at an axial position closer to the combustion chamber of the internal combustion engine than an upstream side end surface of said swirler member.

2. The cylinder injecting fuel injection valve as claimed in claim 1, wherein said metallic elastic member of said gasket is made of a spring steel of a stainless steel group and said support member is made of compound material of non-asbestos material.

3. The cylinder injecting fuel injection valve as claimed in claim 1, wherein said metallic elastic member of said gasket has a surface coating of a fluororesin or fluororubber.

4. The cylinder injecting fuel injection valve as claimed in claim 1, wherein said support member of said gasket is an annular member and said metallic elastic member is an annular member having a U-shaped cross-sectional configuration disposed on a surface of support member.

5. The cylinder injecting fuel injection valve as claimed in claim 1, wherein said gasket comprises a plurality of gasket elements stacked in an axial direction.

6. A cylinder injecting fuel injection valve inserted into a cylinder head of an internal combustion engine and supported by a shoulder portion of a fuel injection valve main body and a shoulder portion of the cylinder head;

said fuel injection valve including a valve seat fading with a combustion chamber when attached to the engine and a swirler member providing whirling movement to injected fuel;

said valve having a seal gasket surrounding, when attached to the engine, said fuel injection valve main body and sealing at least first two of three regions defined between the shoulder portion of the fuel injection valve main body, the shoulder portion of said cylinder head and an outer circumferential portion of said fuel injection valve main body;

said gasket comprising;
     an annular metallic elastic member brought into contact with said shoulder portion of said fuel injection valve main body, said shoulder portion of said cylinder head and said outer circumferential portion of said fuel injection valve main body; and
     an annular support member elastically supporting said metallic elastic member and brought into elastic contact with said shoulder portion of said cylinder head and said shoulder portion of said fuel injection valve main body;
     said metallic elastic member of said gasket having a contacting surface contacting with an outer circumferential portion of said fuel injection valve main body, the end portion of said contacting surface of said metallic member being positioned at an axial position closer to the combustion chamber of the internal combustion engine than an upstream side end surface of said swirler member.

7. The cylinder injecting fuel injection valve as claimed in claim 6, wherein said metallic elastic member of said gasket is made of a spring steel such as stainless steel and said support member is made of compound material of non-asbestos material.

8. The cylinder injecting fuel injection valve as claimed in claim 6, wherein said metallic elastic member of said gasket has a surface coating of a fluororesin or fluororubber.

9. The cylinder injecting fuel injection valve as claimed in claim 6, wherein said support member of said gasket is an annular member and said metallic elastic member is an annular member having a U-shaped cross-sectional configuration disposed on a surface of support member.

10. The cylinder injecting fuel injection valve as claimed in claim 6, wherein said gasket comprises a plurality of gasket elements stacked in an axial direction.

11. A cylinder injecting fuel injection valve inserted into a cylinder head of an internal combustion engine and supported by a shoulder portion of a fuel injection valve main body and a shoulder portion of the cylinder head;

said fuel injection valve including a valve seat facing with a combustion chamber when attached to the engine and a swirler member providing whirling movement to injected fuel;

said valve having a seal gasket sealing, when attached to the engine, at least first two of three regions defined between the shoulder portion of the fuel injection valve main body, the shoulder portion of said cylinder head and an outer circumferential portion of said fuel injection valve main body;

said gasket comprising;

an annular metallic elastic member brought into contact with said shoulder portion of said fuel injection valve main body, said shoulder portion of said cylinder head and said outer circumferential portion of said fuel injection valve main body; and an annular support member elastically supporting said metallic elastic member and brought into elastic contact with said shoulder portion of said cylinder head and said shoulder portion of said fuel injection valve main body;

said gasket having an inner circumferential surface opposing to an outer circumferential surface of at least said swirler body of said swirler body and said valve seat heated by said combustion chamber.

12. The cylinder injecting fuel injection valve as claimed in claim 11, wherein said metallic elastic member of said gasket is made of a spring steel such as stainless steel and said support member is made of compound material of non-asbestos material.

13. The cylinder injecting fuel injection valve as claimed in claim 11, wherein said metallic elastic member of said gasket has a surface coating of a fluororesin or fluororubber.

14. The cylinder injecting fuel injection valve as claimed in claim 11, wherein said support member of said gasket is an annular member and said metallic elastic member is an annular member having a U-shaped cross-sectional configuration disposed on a surface of support member.

15. The cylinder injecting fuel injection valve as claimed in claim 11, wherein said gasket comprises a plurality of gasket elements stacked in an axial direction.

* * * * *